(12) United States Patent
Silverbrook et al.

(10) Patent No.: US 7,286,169 B2
(45) Date of Patent: Oct. 23, 2007

(54) CASCADING IMAGE MODIFICATION USING MULTIPLE DIGITAL CAMERAS INCORPORATING IMAGE PROCESSING

(75) Inventors: Kia Silverbrook, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 871 days.

(21) Appl. No.: 10/642,331

(22) Filed: Aug. 18, 2003

(65) Prior Publication Data

US 2004/0032508 A1 Feb. 19, 2004

Related U.S. Application Data

(62) Division of application No. 09/112,757, filed on Jul. 10, 1998, now Pat. No. 6,624,848.

(51) Int. Cl.
*H04N 5/232* (2006.01)

(52) U.S. Cl. ............... 348/239; 348/211.11; 348/218.1

(58) Field of Classification Search ............ 348/218.1, 348/47, 48, 211.11, 239
See application file for complete search history.

(56) References Cited

U.S. PATENT DOCUMENTS

| | | | |
|---|---|---|---|
| 4,868,676 A | 9/1989 | Matsuura et al. | 358/296 |
| 4,937,676 A | 6/1990 | Finelli et al. | 348/375 |
| 5,138,459 A | 8/1992 | Roberts et al. | 348/231.6 |
| 5,398,131 A | 3/1995 | Hall et al. | 359/465 |
| 5,434,618 A | 7/1995 | Hayashi et al. | 348/231.2 |
| 5,436,657 A | 7/1995 | Fukuoka | 348/231.4 |
| 5,438,359 A | 8/1995 | Aoki | 348/231.9 |
| 5,450,365 A | 9/1995 | Adachi | 365/226 |
| 5,905,529 A | 5/1999 | Inuiya et al. | 348/222.1 |
| 5,907,354 A | 5/1999 | Cama et al. | 348/231.7 |
| 5,914,748 A | 6/1999 | Parulski et al. | 348/239 |
| 5,917,542 A | 6/1999 | Moghadam et al. | 348/231.99 |
| 5,930,528 A | 7/1999 | Ito et al. | 396/2 |
| RE36,338 E | 10/1999 | Fukuoka | 348/231.4 |
| 6,006,039 A * | 12/1999 | Steinberg et al. | 396/57 |
| 6,014,170 A | 1/2000 | Pont et al. | 348/231.4 |
| 6,022,099 A | 2/2000 | Chwalek et al. | 347/57 |
| 6,042,213 A | 3/2000 | Hayasaki | 347/19 |
| 6,141,036 A * | 10/2000 | Katayama et al. | 348/47 |
| 6,157,394 A * | 12/2000 | Anderson et al. | 345/506 |
| 6,188,431 B1 * | 2/2001 | Oie | 348/211.5 |
| 6,204,877 B1 * | 3/2001 | Kiyokawa | 348/211.3 |
| 6,229,565 B1 * | 5/2001 | Bobry | 348/207.99 |
| 6,304,291 B1 | 10/2001 | Silverbrook | 348/187 |
| 6,640,004 B2 * | 10/2003 | Katayama et al. | 382/154 |

FOREIGN PATENT DOCUMENTS

| | | |
|---|---|---|
| EP | 0382044 A2 | 8/1990 |
| EP | 0398295 A2 | 11/1990 |
| EP | 0763930 A1 | 3/1997 |
| WO | WO 95/16323 | 6/1995 |
| WO | WO 96/32265 A | 10/1996 |
| WO | WO 97/06958 A1 | 2/1997 |

* cited by examiner

*Primary Examiner*—David Ometz
*Assistant Examiner*—Pritham D. Prabhakher

(57) ABSTRACT

This patent describes a multi effect system to provide enhanced image effects. The effects are provided by interconnecting a series of camera manipulation units, each of the camera manipulation units applying an image manipulation to an inputted image so as to produce a manipulated output image. The manipulation instructions can be provided by inputting instructions to each manipulation unit by means of detachable cards. The interconnections can include branches and loops wherein required.

34 Claims, 1 Drawing Sheet

CASCADING IMAGE MODIFICATION USING MULTIPLE DIGITAL CAMERAS INCORPORATING IMAGE PROCESSING

CROSS REFERENCES TO RELATED APPLICATIONS

This Application is a Divisional Application of U.S. Ser. No. 09/112,757 filed on Jul. 10, 1998, now issued U.S. Pat. No. 6,624,848.

The following Australian provisional patent applications are hereby incorporated by cross-reference. For the purposes of location and identification, US patent applications identified by their US patent application serial numbers (USSN) are listed alongside the Australian applications from which the US patent applications claim the right of priority.

| Cross-Referenced Australian Provisional Patent Application No. | U.S. Pat. No./Patent Application (Claiming Right of Priority from Australian Provisional Application) |
| --- | --- |
| PO7991 | 6750901 |
| PO8505 | 6476863 |
| PO7988 | 6788336 |
| PO9395 | 6322181 |
| PO8017 | 6597817 |
| PO8014 | 6227648 |
| PO8025 | 6727948 |
| PO8032 | 6690419 |
| PO7999 | 6727951 |
| PO8030 | 6196541 |
| PO7997 | 6195150 |
| PO7979 | 6362868 |
| PO7978 | 6831681 |
| PO7982 | 6431669 |
| PO7989 | 6362869 |
| PO8019 | 6472052 |
| PO7980 | 6356715 |
| PO8018 | 6894694 |
| PO7938 | 6636216 |
| PO8016 | 6366693 |
| PO8024 | 6329990 |
| PO7939 | 6459495 |
| PO8501 | 6137500 |
| PO8500 | 6690416 |
| PO7987 | 7050143 |
| PO8022 | 6398328 |
| PO8497 | 7110024 |
| PO8020 | 6431704 |
| PO8504 | 6879341 |
| PO8000 | 6415054 |
| PO7934 | 6665454 |
| PO7990 | 6542645 |
| PO8499 | 6486886 |
| PO8502 | 6381361 |
| PO7981 | 6317192 |
| PO7986 | 6850274 |
| PO7983 | 09/113054 |
| PO8026 | 6646757 |
| PO8028 | 6624848 |
| PO9394 | 6357135 |
| PO9397 | 6271931 |
| PO9398 | 6353772 |
| PO9399 | 6106147 |
| PO9400 | 6665008 |
| PO9401 | 6304291 |
| PO9403 | 6305770 |
| PO9405 | 6289262 |
| PP0959 | 6315200 |
| PP1397 | 6217165 |
| PP2370 | 6786420 |
| PO8003 | 6350023 |
| PO8005 | 6318849 |
| PO8066 | 6227652 |
| PO8072 | 6213588 |
| PO8040 | 6213589 |
| PO8071 | 6231163 |
| PO8047 | 6247795 |
| PO8035 | 6394581 |
| PO8044 | 6244691 |
| PO8063 | 6257704 |
| PO8057 | 6416168 |
| PO8056 | 6220694 |
| PO8069 | 6257705 |
| PO8049 | 6247794 |
| PO8036 | 6234610 |
| PO8048 | 6247793 |
| PO8070 | 6264306 |
| PO8067 | 6241342 |
| PO8001 | 6247792 |
| PO8038 | 6264307 |
| PO8033 | 6254220 |
| PO8002 | 6234611 |
| PO8068 | 6302528 |
| PO8062 | 6283582 |
| PO8034 | 6239821 |
| PO8039 | 6338547 |
| PO8041 | 6247796 |
| PO8004 | 6557977 |
| PO8037 | 6390603 |
| PO8043 | 6362843 |
| PO8042 | 6293653 |
| PO8064 | 6312107 |
| PO9389 | 6227653 |
| PO9391 | 6234609 |
| PP0888 | 6238040 |
| PP0891 | 6188415 |
| PP0890 | 6227654 |
| PP0873 | 6209989 |
| PP0993 | 6247791 |
| PP0890 | 6336710 |
| PP1398 | 6217153 |
| PP2592 | 6416167 |
| PP2593 | 6243113 |
| PP3991 | 6283581 |
| PP3987 | 6247790 |
| PP3985 | 6260953 |
| PP3983 | 6267469 |
| PO7935 | 6224780 |
| PO7936 | 6235212 |
| PO7937 | 6280643 |
| PO8061 | 6284147 |
| PO8054 | 6214244 |
| PO8065 | 6071750 |
| PO8055 | 6267905 |
| PO8053 | 6251298 |
| PO8078 | 6258285 |
| PO7933 | 6225138 |
| PO7950 | 6241904 |
| PO7949 | 6299786 |
| PO8060 | 6866789 |
| PO8059 | 6231773 |
| PO8073 | 6190931 |
| PO8076 | 6248249 |
| PO8075 | 6290862 |
| PO8079 | 6241906 |
| PO8050 | 6565762 |
| PO8052 | 6241905 |
| PO7948 | 6451216 |
| PO7951 | 6231772 |
| PO8074 | 6274056 |
| PO7941 | 6290861 |
| PO8077 | 6248248 |
| PO8058 | 6306671 |
| PO8051 | 6331258 |
| PO8045 | 6110754 |
| PO7952 | 6294101 |
| PO8046 | 6416679 |
| PO9390 | 6264849 |

-continued

| Cross-Referenced Australian Provisional Patent Application No. | U.S. Pat. No./Patent Application (Claiming Right of Priority from Australian Provisional Application) |
|---|---|
| PO9392 | 6254793 |
| PP0889 | 6235211 |
| PP0887 | 6491833 |
| PP0882 | 6264850 |
| PP0874 | 6258284 |
| PP1396 | 6312615 |
| PP3989 | 6228668 |
| PP2591 | 6180427 |
| PP3990 | 6171875 |
| PP3986 | 6267904 |
| PP3984 | 6245247 |
| PP3982 | 6315914 |
| PP0895 | 6231148 |
| PP0869 | 6293658 |
| PP0887 | 6614560 |
| PP0885 | 6238033 |
| PP0884 | 6312070 |
| PP0886 | 6238111 |
| PP0877 | 6378970 |
| PP0878 | 6196739 |
| PP0883 | 6270182 |
| PP0880 | 6152619 |
| PO8006 | 6087638 |
| PO8007 | 6340222 |
| PO8010 | 6041600 |
| PO8011 | 6299300 |
| PO7947 | 6067797 |
| PO7944 | 6286935 |
| PO7946 | 6044646 |
| PP0894 | 6382769 |

STATEMENT REGARDING FEDERALLY SPONSORED RESEARCH OR DEVELOPMENT

Not applicable.

FIELD OF THE INVENTION

The present invention relates to a data processing method and apparatus and, in particular, discloses a Multi Artcam System.

The present invention further relates to the field of image processing and to user interface mechanisms for performing image processing.

BACKGROUND OF THE INVENTION

Recently, in Australia Provisional Patent Specification entitled "Image Processing Method and Apparatus (Art01)" filed concurrently by the present applicant, a system has been proposed known colloquially as "Artcam" which is a digital camera having an integral printer for printing out sensed images in addition to manipulations of the sensed image which are manipulated as a result of the insertion of a "Artcard" having manipulation instructions thereon into the camera.

SUMMARY OF THE INVENTION

It is an object of the present invention to provide for a multi effect system to provide enhanced image effects.

In accordance with a first aspect of the present invention, there is provided a camera for creating and displaying a manipulated image, the camera comprising:

(a) image capture means configured to capture a real image and convert it to captured image data;
(b) input means configured to receive input image data from a source other than the camera;
(c) image manipulation means configured to receive the input image data from the input means and manipulate it to form a manipulated image;
(d) output means configured to receive the manipulated image from the image manipulation means and to output the manipulated image from the camera; and
(e) display means configured to receive the manipulated image from the image manipulation means and to display the manipulated image.

Preferably, the input means is configured to receive the input image from an input-image-providing camera.

Preferably, some or all of the input and output means comprise at least one USB or Firewire port.

In a preferred form, the output means is configured to output the manipulated image to a manipulated-image-receiving camera.

It is particular preferred that the display means comprise a printer device, the display means being configured to display the manipulated image by printing it.

It is also preferred that the camera further comprise a storage-device reader configured to read image manipulation instructions stored on a manipulation-instruction storage-device. In this case, it is preferred that the image manipulation means is configured to generated the manipulated image by manipulating the input image in accordance with image manipulation instructions received from a manipulation-instruction storage-device via the storage-device reader.

In accordance with a second aspect of the invention, there is provided a plurality of cameras for creating a manipulated image, the plurality of cameras including:

(a) a primary camera, comprising:
  (i) image capture means configured to capture a real image as a primary captured image;
  (ii) image manipulation means configured to manipulate the primary captured image to form a primary manipulated image;
  (iii) image providing means configured to receive the primary manipulated image from the image manipulation means and provide the primary manipulated image to a secondary camera; and
(b) a secondary camera, comprising:
  (i) image capture means configured to capture a real image as a secondary captured image;
  (ii) image receiving means configured to receive the primary manipulated image from the image providing means of the primary camera; and
  (iii) image manipulation means configured to receive the primary manipulated image from the image receiving means and manipulate the primary manipulated image to form a secondary manipulated image.

Preferably, the secondary camera further comprises display means configured to receive the secondary manipulated image from the image manipulation means and display it. More preferably, the display means comprises a printer device configured to print the secondary manipulated image.

In accordance with a third aspect of the invention, there is provided a method for forming a manipulated image, the method comprising the steps of:

(a) providing a primary camera, the primary camera comprising:
  (i) image capture means;
  (ii) image manipulation means; and
  (iii) image providing means; and (b) providing a secondary camera, the secondary camera comprising:
   (i) image capture means;
   (ii) image receiving means; and
   (iii) image manipulation means, the primary camera performing the steps of:
(c) capturing a real image as a captured image using the image capture means;
(d) manipulating the captured image using the image manipulation means to form a primary manipulated image;
(e) providing the primary manipulated image to the secondary camera via the image providing means; and the secondary camera performing the steps of:
(f) receiving the primary manipulated image from the image providing means of the primary camera via the image receiving means of the secondary camera; and
(g) manipulating the primary manipulated image using the image manipulation means to form a secondary manipulated image.

In other aspects, the invention comprises manipulated images from primary or secondary cameras, the images preferably being in printed form,

BRIEF DESCRIPTION OF THE DRAWINGS

Notwithstanding any other forms which may fall within the scope of the present invention, preferred forms of the invention will now be described, by way of example only, with reference to the accompanying drawings which.

DESCRIPTION OF PREFERRED AND OTHER EMBODIMENTS

Figure 1:
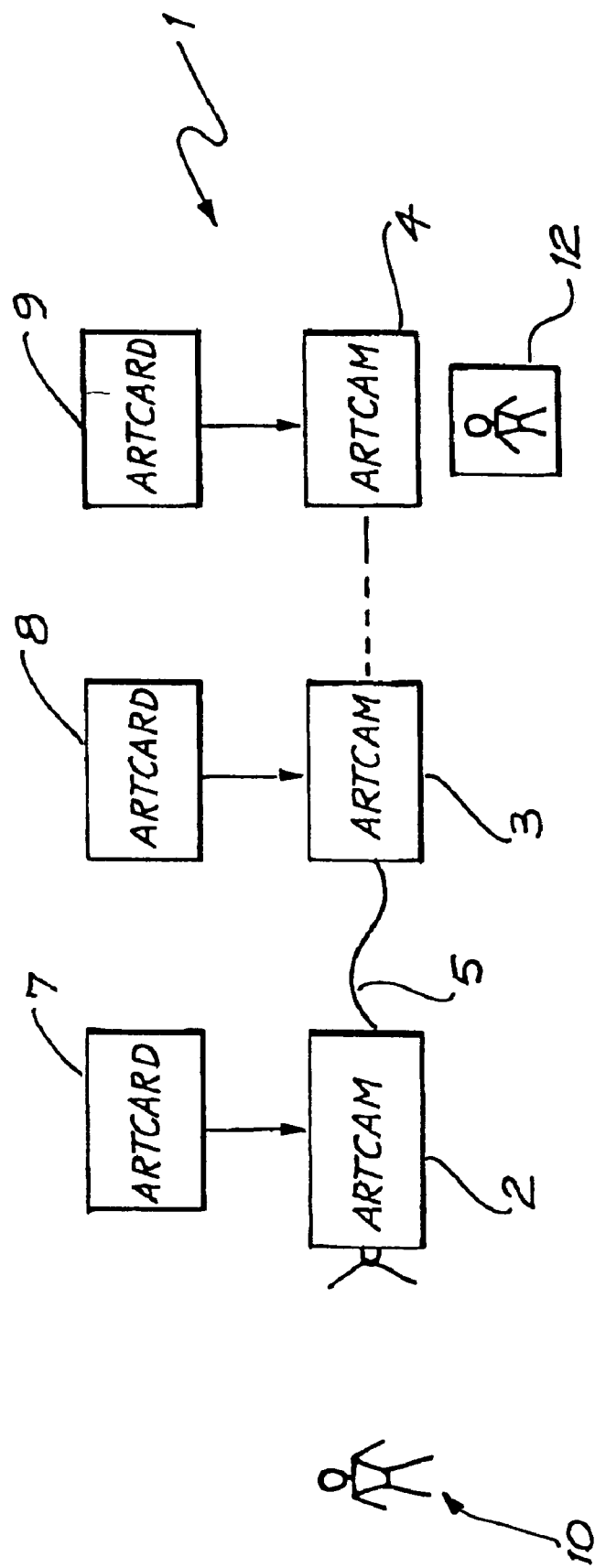
FIG. 1 illustrates the form of interconnection of the preferred embodiment.

The preferred embodiment is preferably implemented through suitable programming of a hand held camera device such as that described in U.S. Ser. No. 09/113,060 and U.S. Ser. No. 09/112,757 filed concurrently herewith by the present applicant the content of which is hereby specifically incorporated by cross reference.

The aforementioned patent specification discloses a camera system, hereinafter known as an "Artcam" type camera, wherein sensed images can be directly printed out by an Artcam portable camera unit. Further, the aforementioned specification discloses means and methods for performing various manipulations on images captured by the camera sensing device leading to the production of various effects in any output image. The manipulations are disclosed to be highly flexible in nature and can be implemented through the insertion into the Artcam of cards having encoded thereon various instructions for the manipulation of images, the cards hereinafter being known as Artcards. The Artcam further has significant onboard processing power by an Artcam Central Processor unit (ACP) which is interconnected to a memory device for the storage of important data and images.

In the preferred embodiment, multiple Artcams as described in the aforementioned patent specification are interconnected via their USB ports so as to provide a cascading of imaging effects. Through suitable programming of the internal computer portions of each Artcam, a cascading of imaging effects can be achieved.

The preferred arrangement is as illustrated in FIG. 1 wherein a series of Artcams, e.g. 2, 3, 4, are interconnected 5 via their USB ports. Each Artcam 2, 3, 4 is provided with a corresponding Artcard 7, 8, 9 having a suitable image manipulation program stored thereon. Further, the instructions for utilisation in a network environment can be provided on the Artcard 7, 8, 9. The image 10 sensed by the Artcam 2 is then manipulated by the manipulation program on Artcard 7 with the result being forwarded 5 to Artcam device 3 which applies the image manipulation function provided on Artcard 8 producing a corresponding output which is forwarded to the next Artcam in the series. The chained Artcam has been modified so as to have two USB ports for this purpose. The final Artcam 4 applies its Artcard manipulation stored on Artcard 9 for producing output 12 which is a conglomeration of each of the previous image manipulations.

The arrangement 1 on FIG. 1 thereby provides the opportunity to apply multiple effects to a single sensed image. Of course, a number of further refinements are possible. For example, each Artcam could print out its own manipulated image in addition to forwarding the image to the next Artcam in the series. Additionally, splitting of paths where one Artcam outputs to two different downstream Artcams which result in different final images being output could also be provided. Additionally, loops, etc., could be utilised.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

Ink Jet Technologies

The embodiments of the invention use an ink jet printer type device. Of course many different devices could be used. However presently popular ink jet printing technologies are unlikely to be suitable.

The most significant problem with thermal ink jet is power consumption. This is approximately 100 times that required for high speed, and stems from the energy-inefficient means of drop ejection. This involves the rapid boiling of water to produce a vapor bubble which expels the ink. Water has a very high heat capacity, and must be superheated in thermal ink jet applications. This leads to an efficiency of around 0.02%, from electricity input to drop momentum (and increased surface area) out.

The most significant problem with piezoelectric ink jet is size and cost. Piezoelectric crystals have a very small deflection at reasonable drive voltages, and therefore require a large area for each nozzle. Also, each piezoelectric actuator must be connected to its drive circuit on a separate substrate. This is not a significant problem at the current limit of around 300 nozzles per print head, but is a major impediment to the fabrication of pagewide print heads with 19,200 nozzles.

Ideally, the ink jet technologies used meet the stringent requirements of in-camera digital color printing and other high quality, high speed, low cost printing applications. To meet the requirements of digital photography, new ink jet technologies have been created. The target features include:
low power (less than 10 Watts)
high resolution capability (1,600 dpi or more)
photographic quality output
low manufacturing cost
small size (pagewidth times minimum cross section)
high speed (<2 seconds per page).

All of these features can be met or exceeded by the ink jet systems described below with differing levels of difficulty.

45 different ink jet technologies have been developed by the Assignee to give a wide range of choices for high volume manufacture. These technologies form part of separate applications assigned to the present Assignee as set out in the table below.

The ink jet designs shown here are suitable for a wide range of digital printing systems, from battery powered one-time use digital cameras, through to desktop and network printers, and through to commercial printing systems.

For ease of manufacture using standard process equipment, the print head is designed to be a monolithic 0.5 micron CMOS chip with MEMS post processing. For color photographic applications, the print head is 100 mm long, with a width which depends upon the ink jet type. The smallest print head designed is IJ38, which is 0.35 mm wide, giving a chip area of 35 square mm. The print heads each contain 19,200 nozzles plus data and control circuitry.

Ink is supplied to the back of the print head by injection molded plastic ink channels. The molding requires 50 micron features, which can be created using a lithographically micromachined insert in a standard injection molding tool. Ink flows through holes etched through the wafer to the nozzle chambers fabricated on the front surface of the wafer. The print head is connected to the camera circuitry by tape automated bonding.

Although the invention has been described with reference to a number of specific examples, it will be appreciated by those skilled in the art that the invention can be embodied in many other forms.

The invention claimed is:

1. A camera for creating and displaying a manipulated image, the camera comprising:
   (a) image capture means configured to capture a real image and convert it to captured image data;
   (b) input means configured to receive input image data from a source other than the camera;
   (c) image manipulation means configured to receive the input image data from the input means and manipulate it to form a manipulated image;
   (d) output means configured to receive the manipulated image from the image manipulation means and to output the manipulated image from the camera;
   (e) display means configured to receive the manipulated image from the image manipulation means and to display the manipulated image;
   (f) a storage-device reader configured to read image manipulation instructions stored on a manipulation-instruction storage-device, wherein the manipulation-instruction storage-device comprises a card having a surface, upon which is printed at least one image manipulation instruction in encoded form.

2. A camera according to claim 1, wherein the input means is configured to receive the input image from an input-image-providing camera.

3. A camera according to claim 2, wherein the input means comprises at least one USB or Firewire port.

4. A camera according to claim 1, wherein the output means is configured to output the manipulated image to a manipulated-image-receiving camera.

5. A camera according to claim 4 wherein the output means comprises at least one USB or Firewire port.

6. A camera according to claim 5 wherein the display means comprises a printer device and wherein the display means is configured to display the manipulated image by printing it.

7. A camera according to claim 1, wherein the image manipulation means is configured to generate the manipulated image by manipulating the input image in accordance with image manipulation instructions received from a manipulation-instruction storage-device via the storage-device reader.

8. A camera according to claim 1, wherein the card comprises an "Artcard" as described herein.

9. A manipulated image formed using a camera according to claim 1.

10. A manipulated image according to claim 9, comprising a printed manipulated image.

11. A plurality of cameras for creating a manipulated image, the plurality of cameras including:
   (a) a primary camera, comprising:
      (i) image capture means configured to capture a real image as a primary captured image;
      (ii) image manipulation means configured to manipulate the primary captured image to form a primary manipulated image;
      (iii) image providing means configured to receive the primary manipulated image from the image manipulation means and provide the primary manipulated image to a secondary camera; and
   (b) a secondary camera, comprising:
      (i) image capture means configured to capture a real image as a secondary captured image;
      (ii) image receiving means configured to receive the primary manipulated image from the image providing means of the primary camera; and
      (iii) image manipulation means configured to receive the primary manipulated image from the image receiving means and manipulate the primary manipulated image to form a secondary manipulated image; wherein the primary and secondary cameras each comprises a storage-device reader configured to read image-manipulation instructions stored on a manipulation-instruction storage-device; and wherein the manipulation instruction storage device comprises a card having a surface and at least one image manipulation instruction printed on the surface in encoded form.

12. A plurality of cameras according to claim 11, wherein the secondary camera further comprises display means configured to receive the secondary manipulated image from the image manipulation means and display it.

13. A plurality of cameras according to claim 12, wherein the display means comprises a printer device configured to print the secondary manipulated image.

14. A plurality of cameras according to claim 11, wherein the secondary camera further comprises image providing means configured to receive the secondary manipulated image from the image manipulation means of the secondary camera and to provide the secondary manipulated image to one or more further cameras.

15. A plurality of cameras according to claim 14, wherein the image providing means of the secondary camera comprises at least one USB or Firewire port.

16. A plurality of cameras according to claim 11, wherein the image providing means of the primary camera comprises at least one USB or Firewire port.

17. A plurality of cameras according to claim 11, wherein the image receiving means of the secondary camera comprises at least one USB or Firewire port.

18. A plurality of cameras according to claim 11, wherein the image manipulation means of the primary camera is configured to form the primary manipulated image by manipulating the input image in accordance with image manipulation instructions received from a manipulation instruction storage device via the storage-device reader of the primary camera.

19. A plurality of cameras according to claim 11, wherein the image manipulation means of the secondary camera is configured to form the secondary manipulated image by manipulating the primary manipulated image in accordance with image manipulation instructions received from a manipulation instruction storage device via the manipulation instruction storage device reader of the secondary camera.

20. A plurality of cameras according to claim 11, wherein said card comprises an "Artcard" as described herein.

21. A secondary manipulated image formed using a plurality of cameras according to claim 11.

22. A secondary manipulated image according to claim 21, comprising a printed secondary manipulated image.

23. A method for forming a manipulated image comprising the steps of:
  (a) providing a primary camera, the primary camera comprising:
    (i) image capture means;
    (ii) image manipulation means; and
    (iii) image providing means; and
  (b) providing a secondary camera, the secondary camera comprising:
    (i) image capture means;
    (ii) image receiving means; and
    (iii) image manipulation means, the primary camera performing the steps of:
  (c) capturing a real image as a captured image using the image capture means;
  (d) manipulating the captured image using the image manipulation means to form a primary manipulated image;
  (e) providing the primary manipulated image to the secondary camera via the image providing means; and the secondary camera performing the steps of:
  (f) receiving the primary manipulated image from the image providing means of the primary camera via the image receiving means of the secondary camera; and
  (g) manipulating the primary manipulated image using the image manipulation means to form a secondary manipulated image;
  wherein the primary and secondary cameras each further comprise a storage-device reader configured to read image-manipulation instructions stored on a manipulation-instruction storage-device; and wherein the manipulation instruction storage device comprises a card having a surface, upon which is printed at least one image manipulation instruction in encoded form.

24. A method according to claim 23, wherein the secondary camera further comprises display means, the method further including the step of displaying the secondary manipulated image using the display means.

25. A method according to claim 24, wherein the display means comprises a printer device and wherein the secondary camera performs the step of displaying the secondary manipulated image by printing the secondary manipulated image using the printer device.

26. A method according to claim 23, wherein the secondary camera further comprises image providing means, the method including the step of providing the secondary manipulated image to a further camera via the image providing means of the second camera.

27. A method according to claim 26, wherein the image providing means of the secondary camera comprises at least one USB or Firewire port.

28. A method according to claim 23, wherein the image providing means of the primary camera comprises at least one USB or Firewire port.

29. A method according to claim 23, wherein the image receiving means of the secondary camera comprises at least one USB or Firewire port.

30. A method according to claim 23, wherein the image manipulation means of the primary camera performs the step of manipulating the captured image by manipulating the captured image in accordance with image manipulation instructions received from a manipulation-instruction storage-device via the storage-device reader of the primary camera.

31. A method according to claim 23, wherein the image manipulation means of the secondary camera performs the step of manipulating the primary manipulated image by manipulating the primary manipulated image in accordance with image manipulation instructions received from a manipulation-instruction storage-device via the storage-device reader of the secondary camera.

32. A method according to claim 23, wherein said card comprises an "Artcard" as described herein.

33. A secondary manipulated image formed by the method of claim 23.

34. A secondary manipulated image according to claim 33, comprising a printed secondary manipulated image.

* * * * *